US006801837B2

United States Patent
Carlstedt et al.

(10) Patent No.: US 6,801,837 B2
(45) Date of Patent: Oct. 5, 2004

(54) INTERVEHICLE NETWORK COMMUNICATION SYSTEM

(75) Inventors: Robert P. Carlstedt, Rochester Hills, MI (US); Mark C. Smith, Troy, MI (US); Steven M. Foster, Rochester, MI (US); Daniel E. Whitney, Arlington, MA (US); Eric S. Geib, Fenton, MI (US); Richard M. Clisch, Canton, MI (US); Shan Shih, Troy, MI (US); Juan J. Marcos Munoz, Navarra (ES)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/038,321

(22) Filed: Jan. 3, 2002

(65) Prior Publication Data

US 2003/0125845 A1 Jul. 3, 2003

(51) Int. Cl.[7] .............................................. G01M 17/00
(52) U.S. Cl. ................. 701/1; 701/30; 701/34
(58) Field of Search ............................. 702/34, 58, 182, 702/183; 701/1, 29, 33, 34, 30, 35, 117, 118

(56) References Cited

U.S. PATENT DOCUMENTS

| | | | |
|---|---|---|---|
| 5,483,446 A | | 1/1996 | Momose et al. ............... 701/1 |
| 5,832,400 A | | 11/1998 | Takahashi et al. ............ 701/53 |
| 5,889,477 A | * | 3/1999 | Fastenrath .................. 340/905 |
| 6,012,012 A | * | 1/2000 | Fleck et al. ................. 701/117 |
| 6,150,961 A | * | 11/2000 | Alewine et al. .......... 340/995.1 |
| 6,151,550 A | * | 11/2000 | Nakatani ..................... 701/117 |
| 6,172,602 B1 | * | 1/2001 | Hasfjord ...................... 340/438 |
| 6,175,787 B1 | * | 1/2001 | Breed .......................... 701/29 |
| 6,178,374 B1 | * | 1/2001 | Mohlenkamp et al. ...... 701/117 |
| 6,212,483 B1 | * | 4/2001 | Carew et al. ................ 702/183 |
| 6,229,438 B1 | * | 5/2001 | Kutlucinar et al. ......... 340/438 |
| 6,317,682 B1 | * | 11/2001 | Ogura et al. ................ 701/117 |
| 6,339,736 B1 | * | 1/2002 | Moskowitz et al. .......... 701/29 |
| 6,401,027 B1 | * | 6/2002 | Xu et al. ..................... 701/117 |
| 6,459,961 B1 | * | 10/2002 | Obradovich et al. ........... 701/1 |
| 6,546,330 B2 | * | 4/2003 | Fushiki et al. .............. 701/118 |

* cited by examiner

Primary Examiner—Tan Q. Nguyen
(74) Attorney, Agent, or Firm—Carlson, Gaskey & Olds

(57) ABSTRACT

An intervehicle network provides for communicating information regarding driving conditions experienced by one vehicle to another remotely located vehicle. By receiving information regarding oncoming driving conditions, the vehicle driver may take action to anticipate the driving condition and avoid potential hazards or inconveniences. Additionally, for vehicles having onboard dynamically adjustable systems, an electronic controller may adjust the performance of the adjustable system responsive to the driving condition information received before the vehicle reaches the location of the driving condition. Another feature of a system designed according to this invention is to have onboard diagnostics where the controller monitors one or more variables to detect when one or more vehicle components are showing signs of aging or wear. Communications between vehicles in a system designed according to this invention may be directly between the vehicles or through a central information communication module.

18 Claims, 1 Drawing Sheet

INTERVEHICLE NETWORK COMMUNICATION SYSTEM

BACKGROUND OF THE INVENTION

This invention generally relates to communications between different vehicles. More particularly, this invention relates to a system for communicating driving condition information between vehicles to anticipate driving conditions.

As drivers travel along roadways, they often encounter driving conditions that pose potential hazards. Examples include obstructions in the roadway, potholes or other breaks in the pavement and traffic situations. Often times, a driver is not able to respond as quickly as desired upon encountering such driving conditions.

Advances in vehicle systems include dynamically adjustable suspension components, for example, that assist a driver in negotiating through various driving conditions. Even with such systems, however, the response time is not always quick enough to accommodate the particular situation. There are inherent communication delays between controllers and the adjustable components between the time the sensors and the controller recognize a condition and the controller provides an appropriate signal for the needed response. Even without a communication delay, there are physical limitations on such adjustable devices that limit their response time.

It would be useful to provide a system that allows a driver or an onboard dynamically adjustable system to anticipate driving conditions to avoid potential hazards entirely or at least to have an anticipatory response when encountering the driving condition. This invention provides such a system.

SUMMARY OF THE INVENTION

In general terms, this invention is an intervehicle communication network that utilizes information gathered at a location of a first vehicle regarding a driving condition and provides that information to a second vehicle approaching the location so that the driver or an onboard system of the second vehicle is able to anticipate the driving condition before encountering it.

A system designed according to this invention includes at least one device supported on a first vehicle that generates a signal indicative of a driving condition at a location of the first vehicle. A receiver receives the driving condition signal. A controller supported on a second vehicle communicates with the receiver and controls at least one device on the second vehicle responsive to the driving condition signal. In this manner, the controller and the device which it controls anticipate the driving condition at the location before the second vehicle reaches the location of the driving condition.

In one example, the receiver portion is located remotely from the vehicles and includes a data processing center that facilitates providing useful information to various vehicles regarding driving conditions within the region the vehicles are traveling.

Another feature of this invention includes onboard diagnostics where the controller on a vehicle gathers information from sensors on the vehicle to anticipate potential repair or replacement needs of one or more vehicle components. In this manner, the system of this invention provides an anticipatory notification of a potential repair or replacement need, which minimizes inconvenience to the vehicle owner and facilitates avoiding undesirable repair costs.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
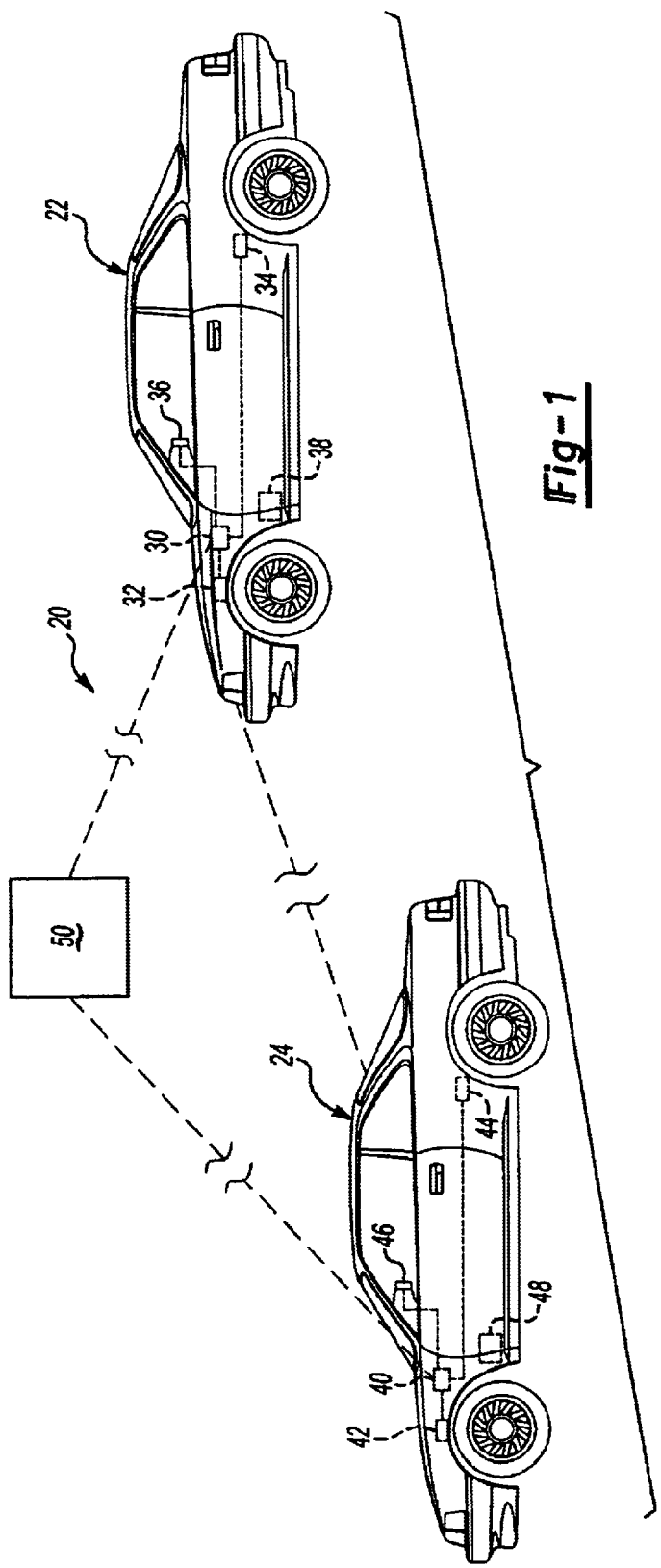
FIG. 1 schematically illustrates a system designed according to this invention.

An intervehicle communication network 20 facilitates gathering information from one vehicle and providing that information to another vehicle regarding any one or more of a variety of driving conditions encountered by different vehicles. In one example system designed according to this invention, information gathered regarding a driving condition encountered by a first vehicle 22 are provided to a second vehicle 24 before the second vehicle 24 reaches the location where the first vehicle 22 encountered the driving condition.

The term "driving condition" as used in this document is intended to encompass a variety of situations experienced by a driver of a vehicle or any one or more of various systems on the vehicle. Information indicative of such a driving condition may include, for example, a road surface condition, activation of antilock brakes or other traction control devices, air bag deployment, or other vehicle dynamics. While rough driving conditions, such as potholes are one example, this invention is not so limited. The type of driving conditions that preferably are addressed by a system designed according to this invention include traffic jams, accidents, slippery driving conditions, poor pavement conditions, etc. Those skilled in the art who have the benefit of this description will realize that there are a variety of driving conditions and associated information that can be relayed between vehicles to facilitate a better driving experience.

The first vehicle 22 includes a controller 30 that communicates with a plurality of onboard devices 32 and 34 that provide an indication of driving conditions. In one example, the devices 32 and 34 include accelerometers that provide an indication of movement of the vehicle wheels relative to the vehicle body when rough driving conditions, such as potholes, are encountered. The controller preferably is also in communication with onboard devices or systems such as air bags and traction control components to receive signals indicating use of such devices or systems. A variety of known sensors or other suitable devices may be used with this invention to provide signals that are indicative of driving conditions.

The controller 30 preferably also communicates with at least one device responsive to information regarding driving conditions. The illustrated example includes a driver interface 36, which preferably includes a display for providing a visual indication to the driver regarding information gathered pertaining to driving conditions. Other responsive devices include dynamically adjustable suspension components 38 that alter the vehicle's suspension system response to various driving conditions, for example. Dynamically adjustable suspension components are known and those skilled in the art who have the benefit of this description will be able to select from among known components to incorporate them into a system or vehicle designed according to this invention.

The second vehicle 24 includes a controller 40 that communicates with devices 42 and 44. The devices 42 and 44, like the devices 32 and 34, preferably provide signals that are indicative of driving conditions encountered by the vehicle 24. A driver interface 46 is supported on the second vehicle 24 and is controlled by the controller 40 to provide information to the driver in visual form. The second vehicle 24 preferably also includes responsive, dynamically adjustable suspension components 48 that are controlled based upon signals from the controller 40. Other devices such as traction control components or a cruise control may also be controlled by the controller independent of driver input depending on the needs of a particular situation.

Information gathered from the devices 32 and 34 regarding driving conditions at a location of the first vehicle 22 preferably are communicated to the second vehicle 24 to allow the controller 40 to anticipate the driving condition before it is encountered by the second vehicle 24. Position information preferably is provided by global positioning technology, which is known. Each vehicle equipped with a controller designed according to this invention preferably includes global positioning technology that permits identification of the location of an encountered driving condition. The global positioning device also provides information regarding the location of each vehicle so that the distance to an anticipated driving condition can be determined. Global positioning technology is known and a variety of commercially available systems may be incorporated into a system designed according to this invention.

In some situations, the vehicles will be in such close proximity that other sensors will provide information sufficient to identify the location of the encountered driving condition. For example, proximity sensors between two vehicles may provide distance information regarding a spacing between the front bumper of one car and the rear bumper of the car in front of it. Such distance information can provide location information to the controller 40 regarding the driving condition encountered by the first car.

One example embodiment of this invention includes using information gathered from road strips or reflectors near the road to determine locations and relative distances. A variety of known technologies can be utilized within a system designed according to this invention. Those skilled in the art who have the benefit of this description will be able to select a combination of components and strategies that best suit the needs of their particular situation.

The information shared between vehicles may be transmitted directly between the controllers 30 and 40, for example. Alternatively, the information can be transmitted through a central communication network 50. Having a central communication network is preferred because it enhances the available range of communication and the availability of a wider variety of information.

One example communication network 50 includes a transceiver portion 52 that receives information from various vehicles and transmits that information to various other vehicles. The transceiver portion may be embodied in a satellite, cellular network tower or other wireless communication devices, for example. The transceiver portion 52 acts as a clearinghouse for information received from various vehicles.

Figure 2:
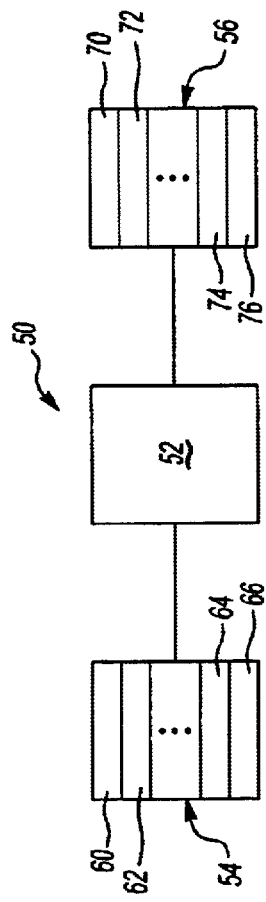
FIG. 2 schematically illustrates a communication network portion of this invention.

In the example of FIG. 2, a first data portion 54 includes data that is stored regarding driving conditions that are not likely to change immediately. For example, potholes may not be fixed for some time. Another example is construction on road segments that may be in progress over time. These types of driving conditions preferably are stored and handled through the first data portion 54.

The preferred embodiment includes segmenting driving condition information into various regions, schematically represented at 60, 62, 64 and 66. By dividing the driving condition information into regions, the transceiver portion 52 is better able to communicate with various vehicles in various regions. A driver in one region need not receive information regarding driving conditions that they are not likely to encounter in another region, for example.

The communication network 50 preferably also includes a real time data portion 56 that is continuously updated. Example types of information that could be handled in the real time data portion 56 include slippery driving conditions, accidents, traffic jams and other types of driving conditions that are likely to change within moments or hours. The real time data portion 56 preferably is divided into regions schematically illustrated as memory portions 70, 72, 74 and 76 to facilitate communicating information only to those vehicles where the information may be useful.

One advantage to separating out real time information is to facilitate a visual display such as an updated map of driving conditions that can be readily viewed by a driver using a commercially available driver interface screen.

Other types of sensors or devices from which information can be gathered include airbag controllers, antilocking brake signals, etc., which may provide useful information regarding slippery driving conditions or an accident, for example.

The controller on each vehicle preferably also monitors information regarding various components of the vehicle. This aspect of a system designed according to this invention allows the system to predict possible repair or replacement needs on the vehicle to provide an advanced indication of such to the vehicle owner so that situations may be addressed before they become too complicated or require related repairs that may increase expenses. Additionally, the inventive arrangement assists a service technician in diagnosing a problem or potential problem with a portion of a vehicle. Accordingly, a system designed according to this invention may include such enhancements that not only allow a driver to anticipate driving conditions but also to allow a variety of individuals to anticipate changes in the operating condition of vehicle components. An onboard monitoring system designed according to this invention may operate in several ways.

One example includes acoustic sensors that detect noises associated with the operation of various components. For example, tire tread separation, bushing wear, worn parts and component failure often result in noises such as knocking, squealing or grinding. Acoustic sensors appropriately positioned to detect such noises will provide information to the controller regarding the condition of the appropriate components. The controller then makes a determination regarding which components may need attention and provides an appropriate indication to the vehicle owner. In one example, the controller provides a visual display to the driver upon vehicle start up and at vehicle shut down. In another example, the information is provided to the driver as the vehicle is traveling down a roadway.

The preferred arrangement includes a database of information regarding frequency and sound quality that distinguishes between potential problem noises and noises that are normally experienced as the vehicle travels down the road because of wind, engine, or road noises, for example.

Other example sensors or monitors include wheel speed sensors, brake pressure monitors, steering angle sensors and heat sensors, for example. A variety of combinations of sensors and monitors are possible and those skilled in the art who have the benefit of this description will be able to choose from among commercially available components to achieve the results desired for a particular situation.

In another example, the controller preferably is programmed to determine whether immediate action is required depending on the signal received regarding the vehicle component of interest. In some cases, for example, the controller may force A lower vehicle speed or provide an audible signal for warning the vehicle driver to take immediate action regarding the potential problem.

In one example, the system determines when repair or replacements of various components may be needed based upon a profile of performance as viewed within a frequency domain. This includes a recognition that the profile of the roughness of performance of the component as described in the frequency domain remains constant in shape but shifts in amplitude with wear or looseness, for example.

For example, a tire condition may be determined by developing a profile dependent on the overall vehicle dynamics. The profile is converted into a three dimensional vibration profile having six degrees of freedom. Vibration in some of those degrees may have much higher amplitude than vibrations in others. The sensing devices and an appropriately programmed controller provide a signature for the vehicle tire associated with the current driving conditions and the road. The signature preferably is based upon vibrations in at least one of the several of the degrees of freedom.

The preferred arrangement includes having the sensors, signal conditioning and controller operating in a frequency range that is as wide as possible. The electronic controller preferably gathers sufficient real time information from the sensors and analyzes it to convert it into a frequency domain plot. This information preferably is supplemented by other information relating to actual driving conditions, such as average vehicle speed and average vehicle weight or other equivalent measurements of total sprung mass. The total information or plot becomes the signature of the component for the current driving conditions and the road. Such information provides a signature of the vibration response of the component (i.e., a tire) at that particular time.

Signature information preferably is stored regarding at least one initial state and periodically over time. By comparing signature information, changes over time can be monitored. Changes in the signature, assuming the same or similar road and driving conditions, provides an indication of changes in the condition or wearability of the tire or other component.

An additional feature in one example of the invention is to compare the signatures of several like components. For example, one front tire compared to the other front tire provides information regarding relative conditions of the two tires.

The controller preferably is programmed to provide information to the vehicle owner, driver or a fleet controller, for example, regarding the determined component condition based upon the signature analysis. The controller preferably also provides recommendations, based upon information stored in memory, for what responsive action should be taken.

Those skilled in the art who have the benefit of this description will be able to suitably program microcontrollers or other processors to perform the functions of the controller (s) of this description. While a variety of controller functions have been described, not all of them are required in a system designed according to this invention. Various combinations of features and capabilities are within the scope of this invention and it will become apparent to those skilled in the art who have the benefit of this description which particular features or functions to include for a particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A system for monitoring a condition of a component on a vehicle, comprising:

at least one sensor device that indicates a condition or a selected component on the vehicle;

a controller that communicates with the sensor device and determines when the selected component may require attention, wherein the controller determines a profile of component performance within a frequency domain; and wherein the controller determines a three dimensional profile having six degrees of freedom and wherein the controller determines a signature of performance of the component for a driving condition, the signature being based upon performance of the component in at least one of the degrees of freedom.

2. The system of claim 1, wherein the controller provides an indication to a vehicle operator that the selected component may require attention.

3. The system of claim 2, including a visual display and wherein the controller provides a visual indication to the vehicle operator.

4. The system of claim 3, wherein the controll provides the visual indication at least upon one of each vehicle start up or each vehicle shut down.

5. The system of claim 3, wherein the controller provides the visual indication at a time when the controller determines that attention may be needed.

6. The system of claim 2, wherein the controller provides an audible indication to the driver.

7. The system of claim 1, wherein the controller alters a performance of the vehicle responsive to determining that the component requires immediate attention.

8. The system of claim 1, wherein the sensor comprises an acoustic sensor that detects a noise associated with operation or the component and the controller determines whether a detected noise indicates that the component may require attention.

9. The system of claim 8, wherein the controller accesses information regarding frequency and sound quality that distinguishes between acceptable noises and noises that arc indicative of potential problems.

10. The system of claim 1, wherein the sensor comprises at least one or a wheel speed sensor, a brake pressure monitor, a steering angle sensor or a heat sensor.

11. The system of claim 1, wherein the controller determines the driving condition corresponding to at least one of average vehicle speed, average vehicle weight or total sprung mass and utilizes the driving condition information when determining the component signature.

12. The system of claim 1, wherein the controller determines an initial signature and compares the initial signature to a later-determined signature for the same component.

13. The system of claim 1, wherein the controller determines a first signature for a first component and a second signature for a second, similar component and wherein the controller compures the first and second signatures when determining the condition of at least one of the first and second components.

14. A system for monitoring a condition of a component on a vehicle, comprising:

at least one sensor device that indicates a condition of a selected component on a vehicle; and a controller that communicates with a sensor device and determines when, the selected component may require attention by determining a three dimensional profile having six degrees of freedom and determining a signature of performance of the component for a driving condition, the signature being based upon performance of the component in at least one of the degrees of freedom.

15. The system or claim 14, wherein the controller determines the driving condition corresponding to at least one of average vehicle speed, average vehicle weight or total sprung mass and utilizes the driving condition information when determining the component signature.

16. The system of claim 14, wherein the controller determines an initial signature and compares the initial signature to a later-determined signature for the same component.

17. The system of claim 14, wherein the controller determines a first signature for a first component and a second signature for a second, similar component and wherein the controller compares the first and second signatures when determining the condition of at least one of the first and second components.

18. The system of claim 14, wherein the controller determines the profile within a frequency domain.

* * * * *

UNITED STATES PATENT AND TRADEMARK OFFICE
CERTIFICATE OF CORRECTION

PATENT NO. : 6,801,837 B2  
APPLICATION NO. : 10/038321  
DATED : October 5, 2004  
INVENTOR(S) : Carlstedt et al.

Page 1 of 1

It is certified that error appears in the above-identified patent and that said Letters Patent is hereby corrected as shown below:

In Claim 1, Column 6, Line 16 of the issued patent, "or" should read as --of--.

In Claim 4, Column 6, Line 35 of the issued patent, "controll" should read as --controller--.

In Claim 8, Column 6, Line 48 of the issued patent, "or" should read as --of--.

In Claim 9, Column 6, Line 53 of the issued patent, "arc" should read as --are--.

In Claim 10, Column 6, Line 56 of the issued patent, "or" should read as --of--.

In Claim 13, Column 7, Line 2 of the issued patent, "compures" should read as --compares--.

In Claim 15, Column 7, Line 17 of the issued patent, "or" should read as --of--.

Signed and Sealed this

Fifth Day of February, 2008

JON W. DUDAS  
*Director of the United States Patent and Trademark Office*